United States Patent
Chin et al.

(10) Patent No.: US 7,953,393 B2
(45) Date of Patent: May 31, 2011

(54) METHOD AND APPARATUS FOR MESSAGE MANAGEMENT IN PORTABLE COMMUNICATION SYSTEM

(75) Inventors: Mi-Ae Chin, Suwon-si (KR); Jin-Goo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 688 days.

(21) Appl. No.: 11/939,922

(22) Filed: Nov. 14, 2007

(65) Prior Publication Data
US 2008/0112547 A1 May 15, 2008

(30) Foreign Application Priority Data
Nov. 14, 2006 (KR) .................. 10-2006-0112066

(51) Int. Cl.
*H04M 1/00* (2006.01)
(52) U.S. Cl. .................. 455/412.1; 455/414.1
(58) Field of Classification Search ............... 455/412.1, 455/412.2, 413, 414.1, 414.4, 453, 466, 566, 455/410, 411
See application file for complete search history.

(56) References Cited

U.S. PATENT DOCUMENTS

| | | | |
|---|---|---|---|
| 6,862,445 B1 * | 3/2005 | Cohen | 455/412.1 |
| 6,983,312 B1 * | 1/2006 | O'Neil | 709/217 |
| 7,519,067 B2 * | 4/2009 | Farmer et al. | 370/395.42 |
| 7,542,772 B2 * | 6/2009 | Jun | 455/466 |
| 2005/0037801 A1 * | 2/2005 | Moore | 455/550.1 |
| 2005/0038854 A1 | 2/2005 | Truty | |
| 2005/0239494 A1 * | 10/2005 | Klassen et al. | 455/550.1 |
| 2005/0288042 A1 | 12/2005 | Lai et al. | |
| 2006/0014553 A1 * | 1/2006 | Oh et al. | 455/466 |
| 2006/0178134 A1 | 8/2006 | Adams et al. | |

FOREIGN PATENT DOCUMENTS
JP 11045117 2/1999
* cited by examiner

Primary Examiner — Jean A Gelin
(74) Attorney, Agent, or Firm — The Farrell Law Firm, P.C.

(57) ABSTRACT

Provided is a method and apparatus for altering a stored message into a single unified message and controlling a capacity of a message box in a portable communication system. The method includes checking an available capacity of a message box; and when the available capacity is less than a critical value, creating and storing a unified message, which is a unification of a plurality of messages stored in the message box, into a single message.

17 Claims, 5 Drawing Sheets

METHOD AND APPARATUS FOR MESSAGE MANAGEMENT IN PORTABLE COMMUNICATION SYSTEM

PRIORITY

This application claims priority under 35 U.S.C. §119(a) to an application filed in the Korean Intellectual Property Office on Nov. 14, 2006 and assigned Serial No. 2006-112066, the contents of which are incorporated herein by reference.

BACKGROUND OF THE INVENTION

1. Field of the Invention

The present invention relates generally to a method and apparatus for message management in a portable communication system, and in particular, to a method and apparatus for altering a stored message into a single unified message and controlling a capacity of a message box in a portable communication system.

2. Description of the Related Art

In recent years, a portable communication system, a necessity to modern people, is being used without distinction among people of all ages. Service providers and system manufacturers are competitively developing products (and services) for differentiation from other enterprises.

For example, portable communication systems are evolving into multimedia equipments for a phone book, a game, a short message, an electronic mail (e-mail) message, a morning wake-up call, an MPEG-1 Audio Layer 3 (MP3), a digital camera, and a wireless Internet service, and provides a variety of services.

Among functions of the portable communication system, a short message function is of much use because of the merit of a relative inexpensiveness compared to voice telephony.

The short message has evolved from a simple character message service into a Multimedia Message System (MMS) that additionally provides a service for a video, a photograph, a music file, etc. The MMS is a typical wired and wireless integration service that is a combination of the merits of a short message service and the merits of an e-mail service. The MMS is frequently used globally by users of the portable communication system.

However, the portable communication system has a limited capacity to store such a kind of short message. For example, assuming that a hundred short messages have been already stored in a portable communication system that is set to store a maximum of one hundred messages, there is a drawback of automatically deleting a previously stored message to store a short message received in the future, or not being capable of receiving a new message, because of the hundred of previously stored messages.

Accordingly, a demand for a method and apparatus for controlling a capacity for storing the message is made to provide a convenience to people using the portable communication system.

SUMMARY OF THE INVENTION

An aspect of the present invention is to substantially solve at least the above problems and/or disadvantages and to provide at least the advantages below. Accordingly, an aspect of the present invention is to provide a method and apparatus for controlling a capacity of a message box in a portable communication system.

Another aspect of the present invention is to provide a method and apparatus for converting a plurality of messages stored in a message box into a single message in a portable communication system.

A further aspect of the present invention is to provide a method and apparatus for checking a unified message in a portable communication system.

The above aspects are achieved by providing a method and apparatus for message management in a portable communication system.

According to one aspect of the present invention, there is provided a method for storing a message in a portable communication system. The method includes checking an available capacity of a message box; and creating and storing a unified message that is a unification of a plurality of messages stored in the message box into a single message, when the available capacity is less than a critical value.

According to another aspect of the present invention, there is provided a method for checking a message in a portable communication system. The method includes when detecting a request for checking a unified message that is a unification of a plurality of messages into a single message, displaying a list of the unified message and receiving a user's selection of the unified message intended for check; and extracting the plurality of messages from the selected unified message and displaying the extracted messages.

According to a further aspect of the present invention, there is provided an apparatus for managing a message in a portable communication system. The apparatus includes a memory for storing an incoming message and an outgoing message, a message management unit for checking an amount of a message stored in the memory and when checking that the amount of the message is greater than a critical value, creating a unified message that is a unification of the message stored in the memory into a single message, and a controller for controlling the message management unit to store a unified message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Below terms, which are defined considering functions in the present invention, can be different depending on a user and an operator's intention or practice. Therefore, the terms should be defined on the basis of the disclosure throughout this specification.

A method and apparatus for controlling a capacity of a message box to manage a stored message in a portable communication system will be described below.

The term "message" includes all incoming/outgoing messages stored in the portable communication system, and includes all Short Message Service (SMS) messages, electronic mail (e-mail) messages, Multimedia Message Service (MMS) messages, etc.

Figure 1:
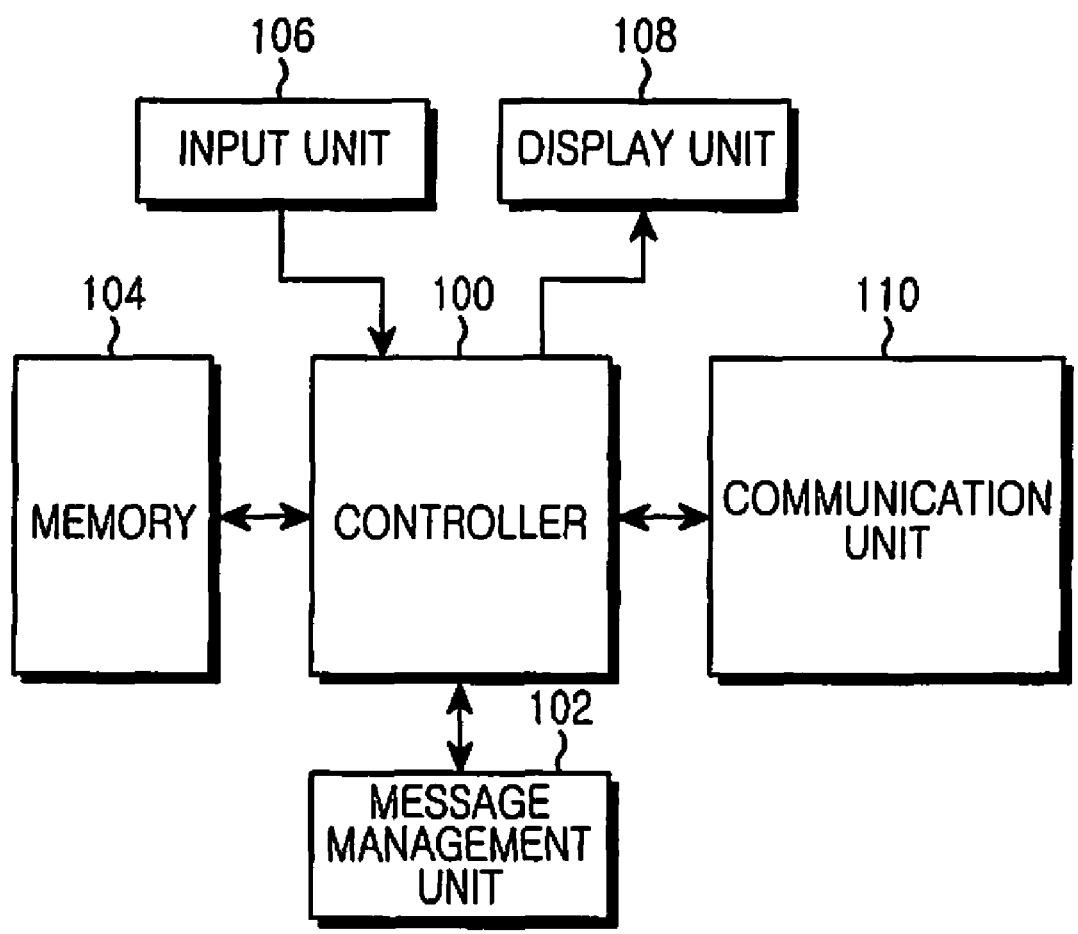
FIG. 1 is a block diagram illustrating an architecture of a portable communication system for controlling a capacity of a message box according to the present invention.

FIG. 1 is a block diagram illustrating an architecture of a portable communication system for controlling a capacity of a message box according to the present invention. The term "portable communication system" includes of all mobile communication systems such as cellular phones, Personal Communication Service (PCS) phones, Personal Digital Assistants (PDA), International Mobile Telecommunications-2000 (IMT-2000) phones, 4th-Generation (4G) broadband system phones, etc. The following description will be made on the basis of a general construction.

Referring to FIG. 1, the portable communication system can include a controller 100, a memory 104, an input unit 106, a display unit 108, and a communication unit 110. The controller 100 can include a message management unit 102.

The controller (i.e., a Micro-Processor Unit (MPU)) 100 controls a general operation of the portable communication system. For example, the controller 100 performs a process and a control for voice telephony and data communication. In addition to general functions, the controller 100 controls the message management unit 102 to check a capacity of a message box of the portable communication system and measure an available capacity of the message box according to the present invention. The controller 100 controls the message management unit 102 to alter a plurality of messages stored in the message box into a single unified message when the measured available capacity of the message box is less than a predefined critical value.

The controller 100 outputs a list of unified messages on the display unit 108 when detecting a unified message check request from the user. After that, when detecting a user's selection of the unified message intended for check, the controller 100 controls the message management unit 102 to extract a plurality of messages from the selected unified message.

The message management unit 102 checks the available capacity of the message box under the control of the controller 100. The message management unit 102 alters messages stored in the message box into a single unified message when the checked available capacity is less than a critical value.

The message management unit 102 extracts messages included in the altered unified message under the control of the controller 100.

The memory 104 consists of a Read Only Memory (ROM), a Random Access Memory (RAM), and a flash ROM. The ROM stores a micro code of a program for a process and a control of the controller 100 and various kinds of reference data.

The RAM, a working memory of the controller 100, stores temporary data generated in execution of all program. The flash ROM stores various kinds of updateable data for safekeeping such as a phone book, an outgoing message, and an incoming message. The flash ROM includes a unified message box for storing a unified message that is the unification of a plurality of messages into a single message according to the present invention.

The input unit 106 includes numeral key buttons '0' to '9', a menu button, a cancel button (delete), an okay button, a talk button, an end button, an Internet button, navigation key (or direction key) buttons, and a plurality of function keys such as a character input key. The input unit 106 provides the controller 100 with key input data associated with a key pressed by the user.

The display unit 108 displays status information generated in execution of the portable communication system, the limited number of characters, and a large amount of moving pictures and still pictures. The display unit 108 can use a color Liquid Crystal Display (LCD).

The communication unit 110 exchanges a radio data signal input/output through an antenna (not shown). For example, in a transmission mode, the communication unit 110 processes data to be transmitted by channel coding and spreading, processes the data by Radio Frequency (RF), and transmits the RF-processed data. In a reception mode, the communication unit 110 converts a received RF signal into a baseband signal, processes the baseband signal by de-spreading and channel decoding, and restores the processed signal to original data.

The controller 100 can perform functions of the message management unit 102. These are separately constructed and shown in the present invention in order to distinguish and describe respective functions. Thus, when a product is actually realized, the product can be also constructed for the controller 100 to process all of the functions.

Figure 2:
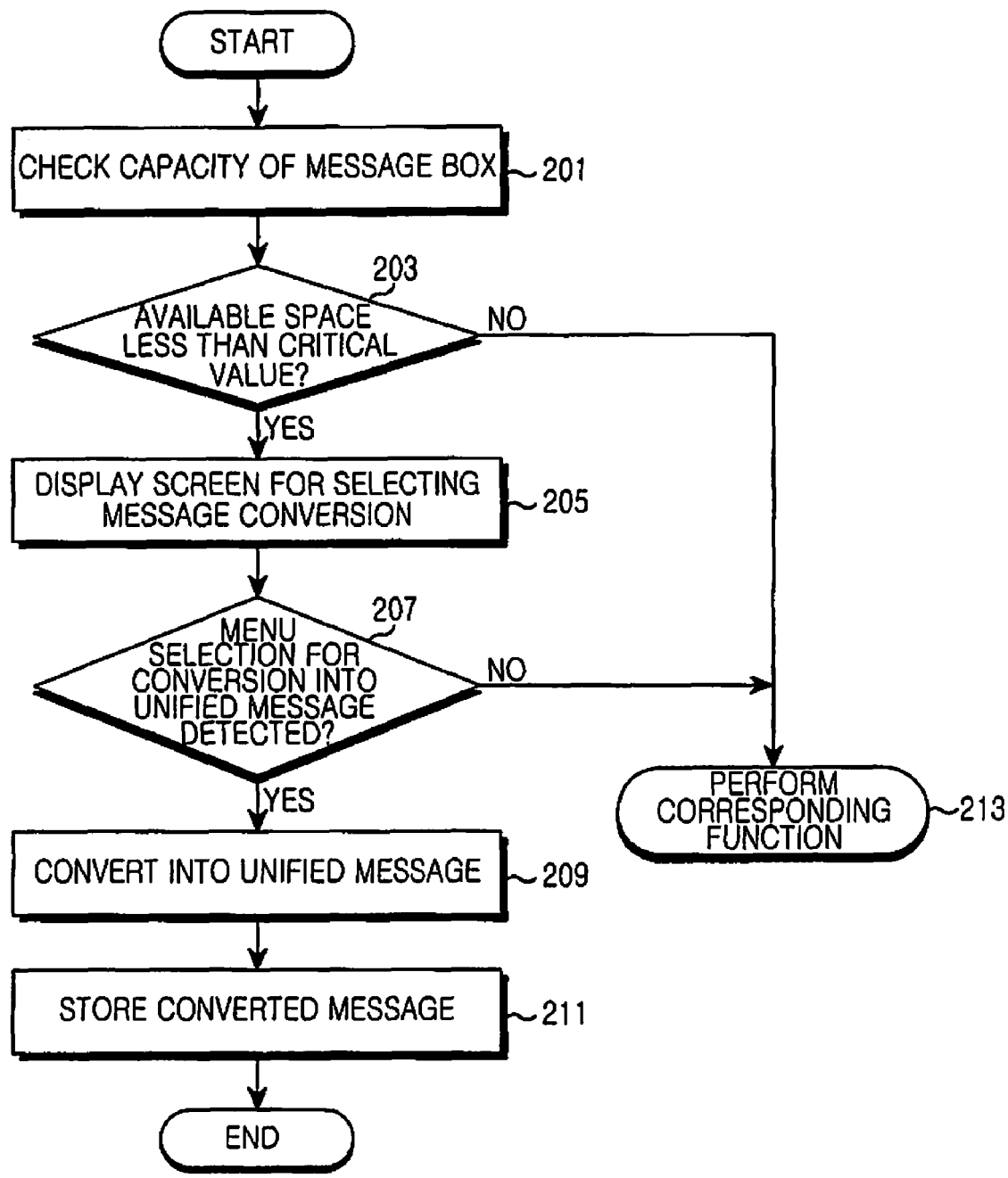
FIG. 2 is a flowchart illustrating a procedure for controlling a capacity of a message box according to an exemplary embodiment of the present invention.

FIG. 2 is a flowchart illustrating a procedure for controlling a capacity of a message box according to an exemplary embodiment of the present invention.

Referring to FIG. 2, in Step 201, the controller 100 of the portable communication system controls the message management unit 102 to check an available capacity of a message box. Under the control of the controller 100, the message management unit 102 can distinguish messages stored in the message box into incoming messages, outgoing messages, or incoming/outgoing messages, and check the available capacity.

In Step 203, the controller 100 checks whether the checked available capacity of the message box is less than a predefined critical value. The predefined critical value, which is a criterion value (e.g., when an available capacity is 10% of a total capacity, when a storage space is insufficient, etc.) for storing the incoming message as a single unified message, can be controlled depending on a user's setup.

The unified message, a message defined according to the present invention, refers to a message obtained by converting a plurality of messages stored in the message box into a single message. The unified message will be in detail described with reference to FIG. 3 below.

In Step 213, the controller 100 performs a corresponding function (e.g., storing an incoming message in a message box) when the check result of the Step 203 is that the available capacity of the message box is greater than a predefined critical value.

In Step 205, the controller 100 displays a window for receiving a selection of conversion into a unified message on the display unit 108 when the check result of the Step 203 is that the available capacity of the message box is less than a predefined critical value.

For example, the controller 100 can display a window including the wording of "There remains 10% available capacity for message storage. Do you want conversion into a unified message?" when the predefined critical value set up by the user is equal to 10% of a total capacity of the message box.

In Step 207, the controller 100 checks for detection of a unified message conversion request for converting a plurality of messages stored in the message box into a single unified message from the user.

In Step 213, the controller 100 performs a corresponding function (e.g., storing a new incoming message after deleting a previously stored message or displaying a message of message storage impossibility caused by insufficient storage space), when not detecting the unified message conversion request from the user.

In Step 209, the controller 100 controls the message management unit 102 to convert the messages of the message box into a single unified message, when detecting the unified message conversion request. At the time of conversion into the unified message, the unified message can be distinguished and stored on a per-caller basis, on a per-reception-date basis, or on a per-message-kind basis (e.g., a spam message, an advertising message) depending on the user's selection.

Also, the unified message can be stored as document data (e.g., a text file, an Excel file, a Word file, etc.) so that it can be accessed in a personal computer.

In Step 211, the controller 100 stores the converted unified message in a unified message box. The unified message box, a storage space independent of the message box, does not have influence on the available capacity of the message box.

Then, the controller 100 terminates the present process.

FIGS. 3A to 3D illustrate screen schemes for converting a plurality of stored messages into a single unified message in a portable communication system according to the present invention.

Figure 3A:
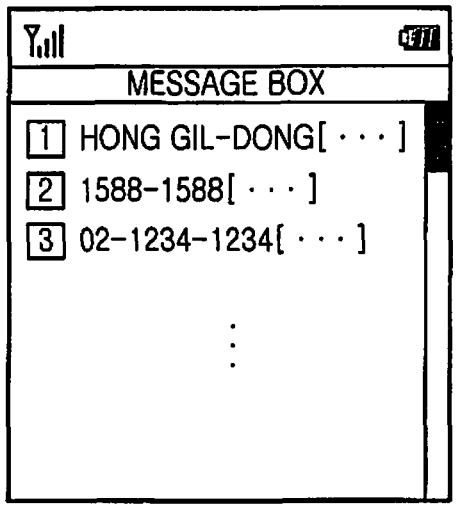
FIGS. 3A to 3D illustrate screen schemes for converting a plurality of stored messages into a single unified message in a portable communication system according to the present invention.

FIG. 3A is a screen for displaying a list of messages stored in a message box of the portable communication system. The messages can be distinguished into outgoing messages, incoming messages, or incoming/outgoing messages for display depending on the user's setup.

Figure 3B:
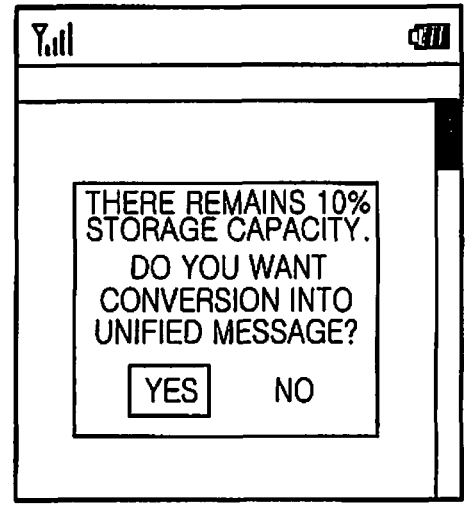

If an available capacity of the message box is less than a critical value, a window for allowing a user to select execution or non-execution of a unified message conversion function is displayed as shown in FIG. 3B.

Figure 3C:
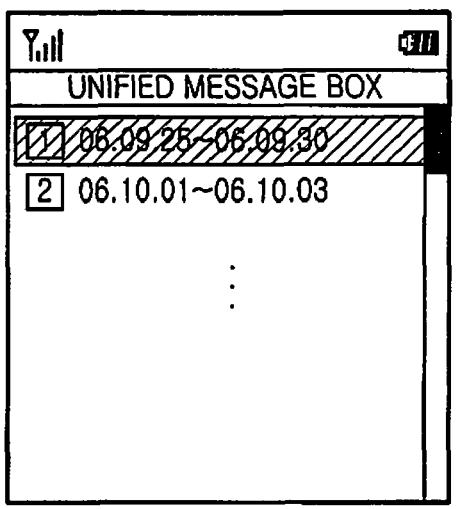

If the user selects a menu for unifying messages of the message box into a single message on a selection screen displayed as in FIG. 3B, the messages are converted into the unified message and are stored as shown in FIG. 3C. The unified message can be displayed together with a period of time for which a corresponding plurality of messages are received.

The unified message is stored in a storage space (e.g., a unified message box) independent of the message box and thus, an amount of the stored unified message does not have an influence on a capacity of the message box.

Figure 3D:
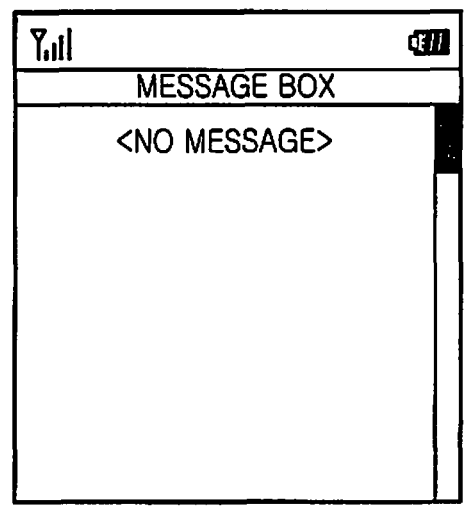

FIG. 3D is a screen illustrating the message box after the conversion into the unified message. If a plurality of messages stored in the message box are altered into a single unified message and the altered single unified message is stored in the unified message box, the previously stored messages are deleted from the message box.

Figure 4:
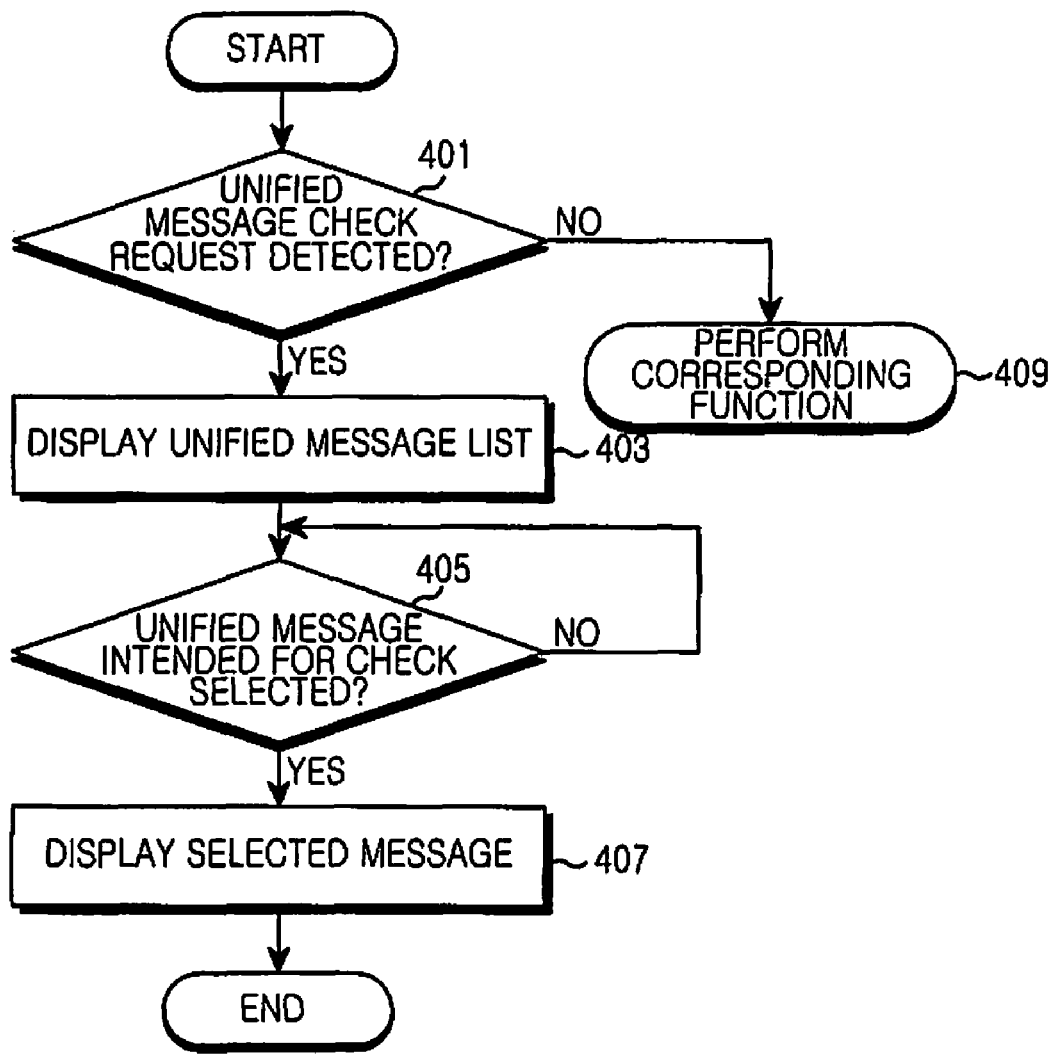
FIG. 4 is a flowchart illustrating a procedure for checking a unified message in a portable communication system according to another exemplary embodiment of the present invention.

FIG. 4 is a flowchart illustrating a procedure for checking a unified message in a portable communication system according to another exemplary embodiment of the present invention.

Referring to FIG. 4, in Step 401, the controller 100 checks whether it detects a unified message check request from the user. In Step 409, the controller 100 performs a corresponding function (e.g., an idle mode) when not detecting the unified message check request.

In Step 403, the controller 100 displays a unified message list when detecting the unified message check request. The unified message list can be acquired by checking items of unified messages stored in a storage unit (e.g., a unified message box) for storing the unified message.

In Step 405, the controller 100 checks whether the user selects the unified message intended for check in the unified message list. The controller 100 repeatedly performs the Step 405 when checking that the user does not selects the unified message.

When checking that the user selects the unified message, in Step 407, the controller 100 displays the selected unified message on the display unit 108. The displaying of the unified message refers to a process of displaying a plurality of messages included in the unified message.

Next, when detecting that the user selects one of the plurality of displayed messages, the controller 100 displays a content of the selected message on the display unit 108. In other words, a plurality of messages can be inversely extracted from the unified message that is a unification of the plurality of messages. A method for displaying the content of the message will be in detail described with reference to FIG. 5 below. The controller 100 then terminates the present process.

Figure 5C:
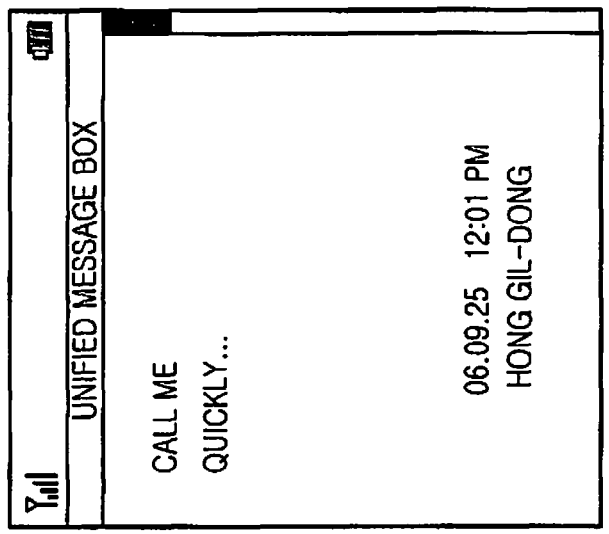
FIGS. 5A to 5C illustrate screen schemes for checking a stored unified message in a portable communication system according to the present invention.
Figure 5B:
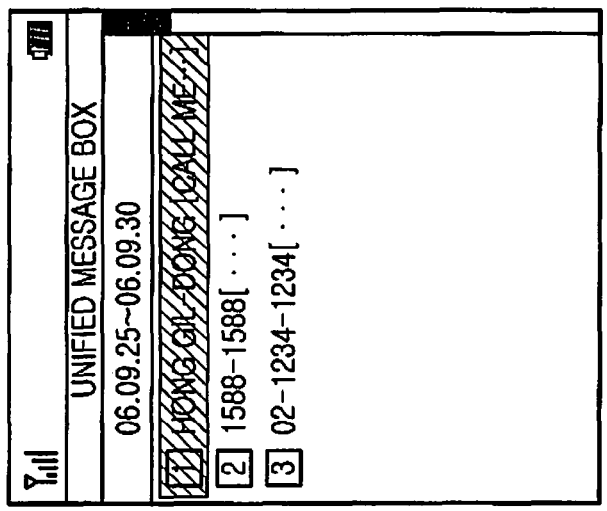
Figure 5A:
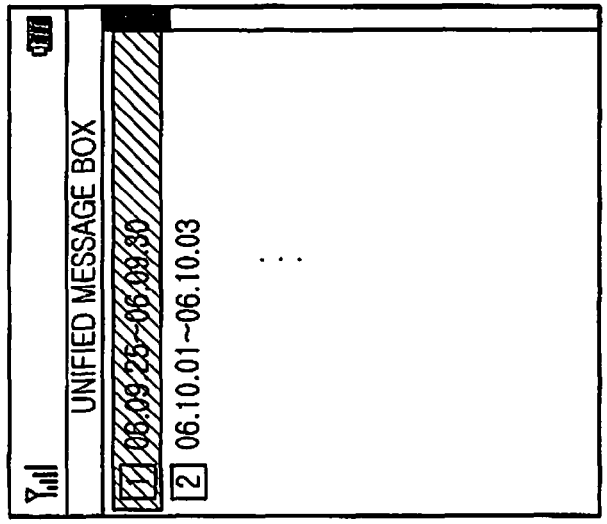

FIGS. 5A to 5C illustrate screen schemes for checking a stored unified message in a portable communication system according to the present invention.

FIG. 5A is a screen illustrating a unified message box for storing only unified messages. The list is a list of the unified messages.

In a case where the user selects a unified message, intended for checking by a user, in the unified message list, sub-messages of the selected unified message are displayed as shown in FIG. 5B. The sub-messages of the unified message represent items of messages included in the unified message.

If the user selects one of the sub-messages, contents of the selected sub-message are displayed as shown in FIG. 5C.

The above-described procedure is implemented in a reverse order of a procedure of converting a message stored in a message box into the unified message.

As described above, in the present invention, in a case where messages are stored up to a predefined capacity in a message box, the stored messages can be converted and stored as a single message, thereby providing a solution to a problem that a conventional portable communication system could not receive a message because a message box has already been filled to capacity.

Also, the present invention stores stored messages as a single unified message, thereby facilitating the management of stored messages.

Alternate embodiments of the present invention can also comprise computer readable codes on a computer readable medium. The computer readable medium includes any data storage device that can store data that can be read by a computer system. Examples of a computer readable medium include magnetic storage media (such as Read-Only Memory (ROM), floppy disks, and hard disks, among others), optical recording media (such as Compact Disc (CD)-ROMs or Digital Versatile Discs (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for storing a message in a portable communication system, the method comprising:
   checking an available capacity of a message box; and
   creating and storing a unified message that is a unification of a plurality of messages stored in the message box into a single message, when the available capacity is less than a critical value,
   wherein the unified message comprises an arrangement of messages previously stored in the portable communication system, based on at least one of a calling number, a caller name, and a message-type, and
   wherein the unified message can be stored in at least one of a text file, a Excel file, and a Word file formats.

2. The method of claim 1, further comprising, after creating and storing the unified message, deleting the plurality of messages previously stored in the portable communication system.

3. The method of claim 1, wherein the message comprises at least one of a Short Message Service (SMS) message, an electronic mail (e-mail) message, and a Multimedia Message System (MMS) message.

4. The method of claim 2, wherein the message comprises at least one of an incoming message, an outgoing message, and an incoming/outgoing message stored in the portable communication system.

5. The method of claim 1, wherein the unified message is stored in a storage space independent of a storage space for storing the plurality of messages.

6. A method for checking a message in a portable communication system, the method comprising:
   when detecting a request for checking a unified message that is a unification of a plurality of messages into a single message, displaying a list of unified messages and receiving a user's selection of the unified message requested by the user; and
   extracting the plurality of messages from the selected unified message and displaying the extracted messages,
   wherein the unified message comprises an arrangement of messages previously stored in the portable communication system, based on at least one of a calling number, a caller name, and a message-type, and
   wherein the unified message can be stored in at least one of a text file, a Excel file, and a Word file formats.

7. The method of claim 6, wherein the message comprises at least one of an SMS message, an e-mail message, and an MMS message.

8. The method of claim 6, wherein the message comprises at least one of an incoming message, an outgoing message, and an incoming/outgoing message stored in the portable communication system.

9. An apparatus for managing a message in a portable communication system, the apparatus comprising:
   a memory for storing incoming messages and outgoing messages;
   a message management unit for checking an amount of a plurality of messages stored in the memory and when checking that the amount of the plurality of messages is greater than a critical value, creating a unified message that is a unification of the plurality of messages stored in the memory into a single message; and
   a controller for controlling the message management unit to store the unified message,
   wherein the unified message comprises an arrangement of messages previously stored in the portable communication system, based on at least one of a calling number, a caller name, and a message-type, and
   wherein the unified message can be stored in at least one of a text file, a Excel file, and a Word file formats.

10. The apparatus of claim 7, wherein the controller controls and deletes the messages previously stored in the memory after creating the unified message.

11. The apparatus of claim 7, wherein the controller extracts the plurality of messages from the unified message.

12. The apparatus of claim 10, wherein the message comprises at least one of an SMS message, an e-mail message, and an MMS message.

13. The apparatus of claim 11, wherein the message comprises at least one of an incoming message, an outgoing message, and an incoming/outgoing message stored in the portable communication system.

14. An apparatus for storing a message in a portable communication system, the method comprising:
   means for checking an available capacity of a message box; and
   means for creating and storing a unified message that is a unification of a plurality of messages stored in the message box into a single message, when the available capacity is less than a critical value,
   wherein the unified message comprises an arrangement of messages previously stored in the portable communication system, based on at least one of a calling number, a caller name, and a message-type, and
   wherein the unified message can be stored in at least one of a text file, a Excel file, and a Word file formats.

15. An apparatus for checking a message in a portable communication system, the method comprising:
   means for displaying a list of unified messages and receiving a user's selection of a unified message requested by a user; and
   means for extracting a plurality of messages from the selected unified message and displaying the extracted messages,
   wherein the unified message comprises an arrangement of messages previously stored in the portable communication system, based on at least one of a calling number, a caller name, and a message-type, and
   wherein the unified message can be stored in at least one of a text file, a Excel file, and a Word file formats.

16. A non-transitory computer-readable recording medium having recorded thereon a program storing a message in a portable communication system, the method comprising:
   a first segment, for checking an available capacity of a message box; and
   a second segment, for creating and storing a unified message that is a unification of a plurality of messages stored in the message box as a single message, when the available capacity is less than a critical value,
   wherein the unified message comprises an arrangement of messages previously stored in the portable communication system, based on at least one of a calling number, a caller name, and a message-type, and
   wherein the unified message can be stored in at least one of a text file, a Excel file, and a Word file formats.

17. A non-transitory computer-readable recording medium having recorded thereon a program checking a message in a portable communication system, the method comprising:
- a first segment, for displaying a list of unified messages and receiving a user's selection of a unified message requested by the user; and
- a second segment, for extracting the plurality of messages from the selected unified message and displaying the extracted messages, wherein the unified message comprises an arrangement of messages previously stored in the portable communication system, based on at least one of a calling number, a caller name, and a message-type, and wherein the unified message can be stored in at least one of a text file, a Excel file, and a Word file formats.

* * * * *